Sept. 25, 1951 R. S. CURRY, JR 2,568,719
CONTROL SYSTEM FOR AIRCRAFT CONTROL SURFACE AND TAB
Filed April 9, 1947
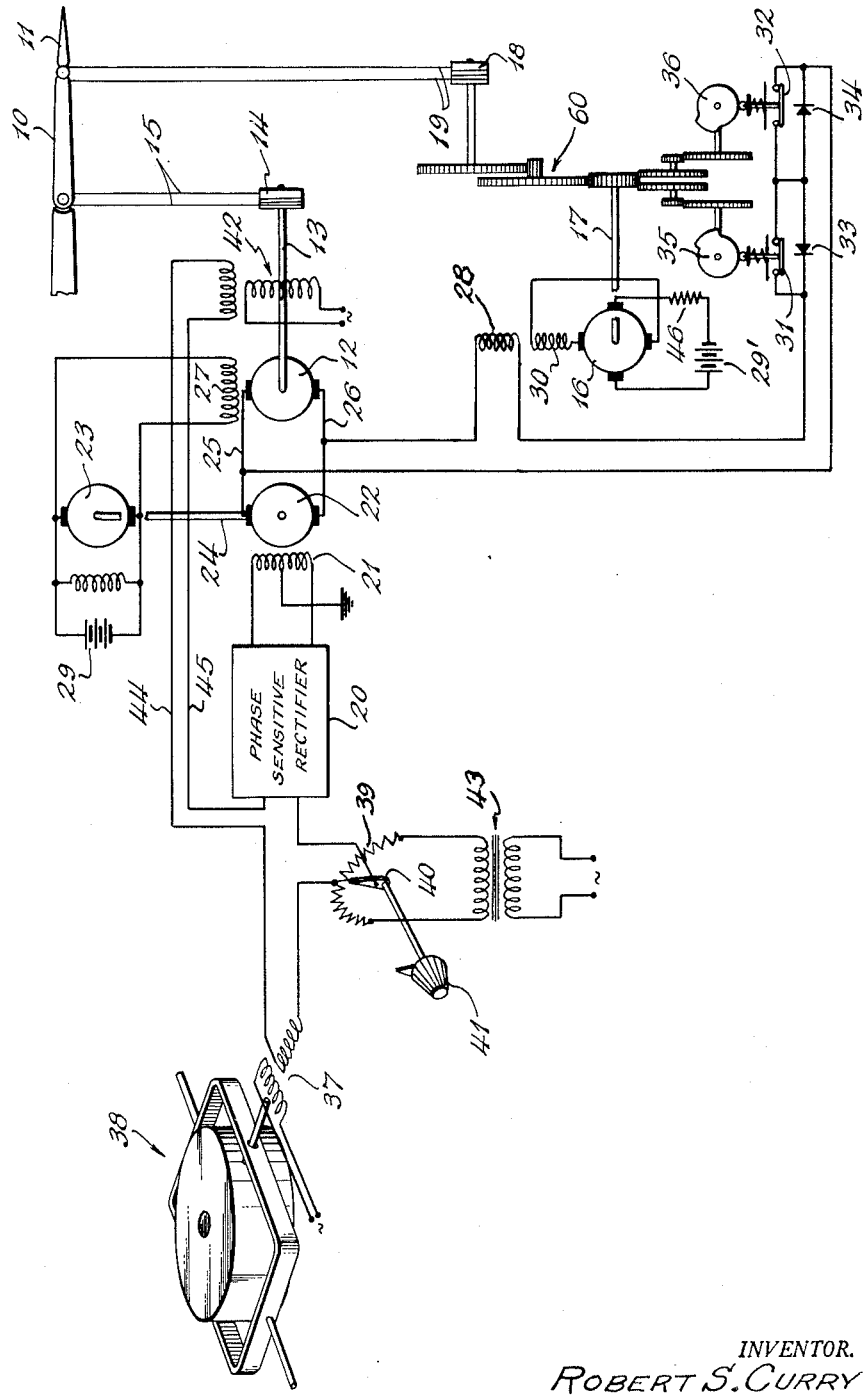
INVENTOR.
ROBERT S. CURRY
BY
Herbert H. Thompson
his ATTORNEY Patented Sept. 25, 1951

2,568,719

UNITED STATES PATENT OFFICE 2,568,719

CONTROL SYSTEM FOR AIRCRAFT
CONTROL SURFACE AND TAB

Robert S. Curry, Jr., Baldwin, N. Y., assignor to
The Sperry Corporation, a corporation of Delaware Application April 9, 1947, Serial No. 740,417

7 Claims. (Cl. 244—82)

1

This invention relates generally to control systems and more particularly to automatic pilots for air-borne or other craft with a main operating surface and an auxiliary or trim tab operating surface.

Primarily, the object of the invention is to minimize any sustained cable loading on the control surfaces of the craft to permit the human pilot to assume control of the craft from the automatic pilot without undue exertion, and to secure a minimum resistance. While such systems have heretofore been used in connection with hydraulic servomotors, as shown in the prior patents to B. G. Carlson, 2,045,579 and 2,183,932 dated June 20, 1936, and December 19, 1937, respectively, my invention relates to an improved means for accomplishing the stated purpose in an electrical servo-system.

The motor controlling the primary surface furnishes the primary control of the craft, while the motor controlling the trim tab may be much smaller and in some types of aircraft is not needed, and also is somewhat intermittent in operation.

One object of the invention is to so design the motor circuits that the trim tab motor may be controlled from the same signal that the main motor is without disturbing the characteristics of the control of the main motor regardless of whether the trim tab motor is present or absent from the circuit. The Ward-Leonard type of control system has come into use for controlling servomotors on aircraft, one such system being shown in the patent to Halpert, Frische, Bird and Esval, No. 2,415,819, dated February 18, 1947, and in an application of Halpert, Serial No. 485,546, filed May 3, 1943, for Automatic Pilot Follow-up Control, now U. S. Patent No. 2,511,846, issued June 20, 1950. In such systems, if an extra variable load of appreciable size were placed on the current supply between the armatures of the generator and the main control motor, the control characteristics of the motor might be seriously affected. According to my invention, however, I reduce the current required for controlling the trim tab motor by furnishing an auxiliary, more or less constant current supply for the armature and only controlling the field thereof from the signal current supplied to the armature of the main motor.

In accordance with the present invention, an electric motor for the main surface and an electric motor for the tab surface are selectively operated from the same corrective signal. The motor connected to the main surface of the craft

2 operates to correct short-time transient errors, such as caused by shifting gusts of wind on the craft and which are usually of fair magnitude. The motor connected to the tab surface operates to correct the craft for any sustained or long-period errors, such as caused by a permanent shift in loading of the craft and which are usually of lesser magnitude.

One of the features of the invention consists in utilizing two motors in a system of the Ward-Leonard type, controlling the motor for the main surface in more or less conventional manner by direct armature control but controlling a field of the other motor.

The invention also relates to the novel features or principles of the instrumentalities described herein, whether or not such are used for the stated objects, or in the stated fields or combinations.

Other features and structural details of the invention will be apparent from the following description when read in connection with the accompanying drawing, wherein the single view shown is a circuit diagram and schematic representation of the components of a control system or automatic pilot embodying the present inventive concepts.

With reference to the drawing, an aircraft is shown with a main control surface 10 and a trim tab control surface 11. For exemplary purposes, the surface 10 may be considered to be the elevator of the craft. The automatic pilot represented in the drawing is consequently effective to control the craft in pitch about its athwartship axis by operation of the main and trim tab surfaces 10 and 11.

As shown, the main surface 10 is moved by means of an electric motor 12 operatively connected thereto by way of shaft 13, cable drum 14 and cable 15. The trim tab 11 is moved by means of a second and much smaller electric motor 16 that is operatively connected to the surface by shaft 17, drum 18 and cable 19 through a much larger reduction gear 60 than between motor 12 and drum 14. In the type of automatic pilot system illustrated, the output of a phase sensitive rectifier indicated generally at 20, which may be of the type shown in Fig. 2 of U. S. Patent No. 2,511,846, by Percy Halpert, is fed the field winding 21 of a generator 22. The armature of generator 22 is driven at a constant speed by means of motor 23 which is connected thereto by shaft 24. Generator 22 provides a signal voltage that is fed to the armature of the direct current motor 12 by way of leads 25 and 26 as is common in the Ward-Leonard system of motor control. Motor 12 turns an amount corresponding to the amplitude or magnitude of the alternating current input signal to the amplifier 20 and in a direction corresponding to the phase of the input signal. The field winding 27 of motor 12 is constantly excited by any source of direct current, shown as a battery 29.

Generator 22 may be considered to provide a means for producing a control signal for motors 12 and 16. The armature of motor 12, leads 25 and 26 and the armature of the generator 22 form a control circuit. As shown, motor 16 has a field winding 28 situated in a second circuit connected in parallel across the leads 25 and 26 of the first circuit. Both motors 12 and 16 are located in a circuit that includes the signal producing means, the armature of first motor 12 and the field winding 28 of second motor 16. The armature of motor 16 is constantly excited by means such as battery 29'. A second field winding 30 may provide a means for damping and limiting the speed of operation of motor 16 as shown and claimed in my copending application Serial No. 680,352 filed June 29, 1946 for Servomotors, now U. S. Patent No. 2,474,830, issued July 5, 1949. A series resistor 46 is provided to maintain a constant armature current for motor 16.

The parallel circuit including field winding 28 has two branches, each of which is shown to include a switch and a selenium type rectifier. The pair of switches and rectifiers are indicated respectively at 31, 32 and 33, 34. Limit switches 31 and 32 are opened by cams 35 and 36 respectively, which are connected through suitable gearing, as indicated, to the shaft 17. The switches are operated by the cams to open the circuit and thereby limit the range of operation of motor 16, so that tab 11 is confined to movement within a predetermined angle above and below a null position.

The rectifiers 33 and 34 are used to block current flow in the proper sense to prevent motor 16 from rotating beyond the limit point but will permit operation in the reverse direction to return the system to the null position. The field circuit including the trim tab operating motor 16 is designed to draw about 5% of the power output of the generator 22 under maximum signal conditions. Motor 16 is further designed to operate at a lower voltage than motor 12. The relation between the respective motors, other controls and the control surfaces is such that the main motor 12 functions to correct the craft for short-time transient errors and the auxiliary motor 16 functions to correct the craft for sustained or long-period errors. In other words, motor 16 will operate to cause a displacement of tab 11, on receipt of a small continuing signal whereas, for that same voltage the motor 12 would not respond. As such a signal is of the sort resulting from an out of trim condition causing long period errors, motor 16 or more precisely trim tab 11 may be said to be responsive to long period errors, to which result the reduction gearing 60 contributes. The motor 12, on the other hand, requiring a much larger signal to operate, i. e., a signal of the type produced by gusts, etc., is quickly responsive to such short time or transient errors so that control surface 10, having little or no reduction gearing between it and the motor 12 is likewise quickly responsive to such errors so as to right the craft quickly.

In an automatic pilot with a dual motor control system, the corrective input to rectifier 20 may be obtained from a pickoff 37 at the pitch axis of gyro vertical 38. The input may also be obtained from a potentiometer 39 with a movable arm 40 settable by manually positioned knob 41 to cause the craft to change elevation. A further input signal may be obtained from a pickoff 42 providing a signal in accordance with the displacement or angular position of shaft 13 or surface 10 from a null position. Pickoffs 37 and 42 may be signal generators of the Selsyn type. As shown, the rotor of pickoff 37 is operatively connected to the rotor case of the gyro vertical 38 to be stabilized thereby. The rotor of Selsyn 42 is adapted to move with movement of shaft 13 or the surface 10. Center tapped potentiometer 39 is energized from a suitable source by way of transformer 43. The output of the stator of pickoff 42 provides a displacement repeatback signal that may be fed to amplifier 20 by way of leads 44, 45 in opposition to the signal input from either pickoff 37 or potentiometer 39 or both. In the described type of automatic pilot, when the signal from pickoff 42 balances the inputs from the other sources, the system attains equilibrium with a net zero input to the rectifier 20. Otherwise, the rectifier 20 provides an output to the generator 22 which results in operation of either or both of motors 12, 16 to cause the craft to move about its athwartship axis to a position obviating the errors.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft with a main control surface and a trim tab control surface, a first electric motor operatively connected to the main control surface, said first motor having an armature and a constantly excited field, a second electric motor operatively connected to the trim tab control surface, said second motor having a field and a constantly energized armature, means for producing a control signal for said motors, and a circuit having said signal producing means therein including the armature of said first motor and the field of said second motor.

2. In an automatic pilot for aircraft with a main control surface and a trim tab control surface, a first electric motor operatively connected to the main control surface, said first motor having an armature and a constantly excited field, means for producing a control signal for said first motor, a first circuit including said signal producing means and the armature of said first motor, a second electric motor operatively connected to the trim tab control surface, said second motor having a field and a constantly energized armature, and a second circuit including the field of said second motor connected in parallel to said first circuit.

3. An automatic pilot as claimed in claim 2, in which said second circuit further includes a pair of switches operated by said trim tab to open the circuit and thereby limit the range of movement of the trim tab.

4. In a control system of the Ward-Leonard type, the combination of, a first electric motor having an armature and a separately excited field, a second electric motor having a field and a separately energized armature, a generator for producing a control signal for both said motors, and a circuit having said signal producing means therein including the armature of said first motor and the field of said second motor.

5. In a control system, the combination of, a first electric motor having an armature and a constantly excited field, means for producing a control signal for said first motor, a first circuit including said signal producing means and the armature of said first motor, a second electric motor having a field and a constantly energized armature, and a second circuit including the field of said second motor connected in parallel to said first circuit.

6. In an automatic pilot for aircraft with a main control surface and a trim tab control surface, means for producing relatively large control signals corresponding to short period aircraft attitude errors and relatively small control signals corresponding to long period aircraft attitude errors, a circuit including said signal means and a first electric motor connected to the main control surface responsive to the short period signals of said signal means, and a second circuit connected in parallel to said first circuit including a second electric motor connected to the trim tab control surface responsive to the long period signals of said signal means.

7. An automatic pilot as claimed in claim 6, in which said second circuit further includes a pair of switches operated by said trim tab to open the circuit and thereby limit the range of operation of said second motor.

ROBERT S. CURRY, JR.

REFERENCES CITED

The following references are of record in the file of this patent:

UNITED STATES PATENTS

| Number | Name | Date |
| --- | --- | --- |
| 1,536,996 | Winter | May 5, 1925 |
| 2,325,548 | Roos et al. | July 27, 1943 |

FOREIGN PATENTS

| Number | Country | Date |
| --- | --- | --- |
| 839,030 | France | Dec. 26, 1938 |